US011809761B2

(12) United States Patent
Oplado

(10) Patent No.: US 11,809,761 B2
(45) Date of Patent: Nov. 7, 2023

(54) IMAGE PROCESSING SYSTEM THAT TRANSMITS A SECOND PRINT APPROVAL CODE TO EACH OF PLURALITY OF MAIL ADDRESSES, WHEN PRIVATE PRINT MODE IS SET, AND EXECUTES PRINT JOB WHEN FIRST PRINT APPROVAL CODE RECEIVED THROUGH INPUT DEVICE ACCORDS WITH SECOND PRINT APPROVAL CODE

(71) Applicant: KYOCERA Document Solutions Inc., Osaka (JP)

(72) Inventor: Victorie Maia Oplado, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/864,284

(22) Filed: Jul. 13, 2022

(65) Prior Publication Data

US 2023/0024703 A1   Jan. 26, 2023

(30) Foreign Application Priority Data

Jul. 20, 2021   (JP) .................................. 2021-119971

(51) Int. Cl.
  *G06F 3/12*   (2006.01)
(52) U.S. Cl.
  CPC .......... *G06F 3/1222* (2013.01); *G06F 3/1238* (2013.01)
(58) Field of Classification Search
  None
  See application file for complete search history.

(56) References Cited

U.S. PATENT DOCUMENTS

| 2003/0007172 A1* | 1/2003 | Takayanagi | G06F 3/1222 358/1.15 |
| 2014/0092413 A1* | 4/2014 | Shibata | H04N 1/00244 358/1.13 |
| 2016/0253127 A1* | 9/2016 | Panda | G06K 19/06112 358/1.15 |
| 2018/0285036 A1* | 10/2018 | Bermundo | G06F 3/1273 |

FOREIGN PATENT DOCUMENTS

| EP | 2500851 A1 * | 9/2012 | G06Q 10/107 |
| JP | 2008192051 A | 8/2008 | |

* cited by examiner

*Primary Examiner* — Thomas D Lee
(74) *Attorney, Agent, or Firm* — IP BUSINESS SOLUTIONS, LLC

(57) ABSTRACT

An image processing system includes an information processing apparatus and an image forming apparatus. A first controller of the information processing apparatus transmits a print job, a setting instruction, and a plurality of mail addresses, to the image forming apparatus, upon receipt of a private print mode setting instruction through an operation device. A second controller of the image forming apparatus sets the private print mode, upon receipt of the print job, the setting instruction, and the plurality of mail addresses, generates a second print approval code, transmits the second print approval code to each of the plurality of mail addresses, and executes the print job, when the first print approval code is received via an input device, and the first print approval code and the second print approval code accord with each other, by causing the image forming device to form the image on the recording medium.

4 Claims, 5 Drawing Sheets

IMAGE PROCESSING SYSTEM THAT TRANSMITS A SECOND PRINT APPROVAL CODE TO EACH OF PLURALITY OF MAIL ADDRESSES, WHEN PRIVATE PRINT MODE IS SET, AND EXECUTES PRINT JOB WHEN FIRST PRINT APPROVAL CODE RECEIVED THROUGH INPUT DEVICE ACCORDS WITH SECOND PRINT APPROVAL CODE

INCORPORATION BY REFERENCE

This application claims priority to Japanese Patent Application No. 2021-119971 filed on Jul. 20, 2021, the entire contents of which are incorporated by reference herein.

BACKGROUND

The present disclosure relates to an image processing system that transmits a print job to an image forming apparatus from an information processing apparatus such as a personal computer (PC), via a network, to cause the image forming apparatus to execute the print job, and in particular to a private print technique that improves confidentiality of the print job.

Some of existing image processing systems are configured to transmit a print job to an image forming apparatus from an information processing apparatus such as a PC, via a network, and to cause the image forming apparatus to execute the print job. With such an image processing system, the user of the information processing apparatus has to go to the installation site of the information processing apparatus, to acquire the recording sheet on which an image has been formed as result of the execution of the print job. In this case, the recording sheet is left unattended until the user arrives at the image forming apparatus, and therefore the confidentiality of the image may fail to be protected.

In addition, a printing system is known in which, to maintain the confidentiality of the print job, a client terminal such as a PC transmits a two-dimensional barcode representing print job authentication data to a mobile terminal by e-mail, the mobile terminal displays the two-dimensional barcode on a screen, an authentication device reads the two-dimensional barcode, converts the barcode into the print job authentication data, and transmits a print request based on the print job authentication data to the client terminal, the client terminal transmits the print job based on the print request to a printer terminal, and the printer terminal executes the print job.

SUMMARY

The disclosure proposes further improvement of the foregoing techniques.

In an aspect, the disclosure provides an image processing system including an information processing apparatus and an image forming apparatus. The information processing apparatus includes an operation device, a first communication device, and a first control device. To the operation device, an instruction of a user is inputted. The first communication device performs data communication with the image forming apparatus, via a network. The first control device includes a processor, and acts as a first controller when the processor executes a first control program. Upon receipt of a private print mode setting instruction through the operation device, the first controller transmits a print job, the setting instruction, and a plurality of prespecified mail addresses, to the image forming apparatus via the first communication device. The image forming apparatus includes an image forming device, a second communication device, an input device, and a second control device. The image forming device forms an image on a recording medium. The second communication device performs data communication with the information processing apparatus, via the network. To the input device, a first print approval code is inputted. The second control device includes a processor, and acts as a second controller when the processor executes a second control program. Upon receipt of the print job, the setting instruction, and the plurality of mail addresses via the second communication device, the second controller sets the private print mode, generates a second print approval code, transmits the second print approval code to each of the plurality of mail addresses via the second communication device, and executes the print job, in a case where the first print approval code and the second print approval code accord with each other, when the first print approval code is received via the input device, by causing the image forming device to form the image on the recording medium.

DETAILED DESCRIPTION

Hereafter, an image processing system according to an embodiment of the disclosure will be described, with reference to the drawings.

Figure 1:
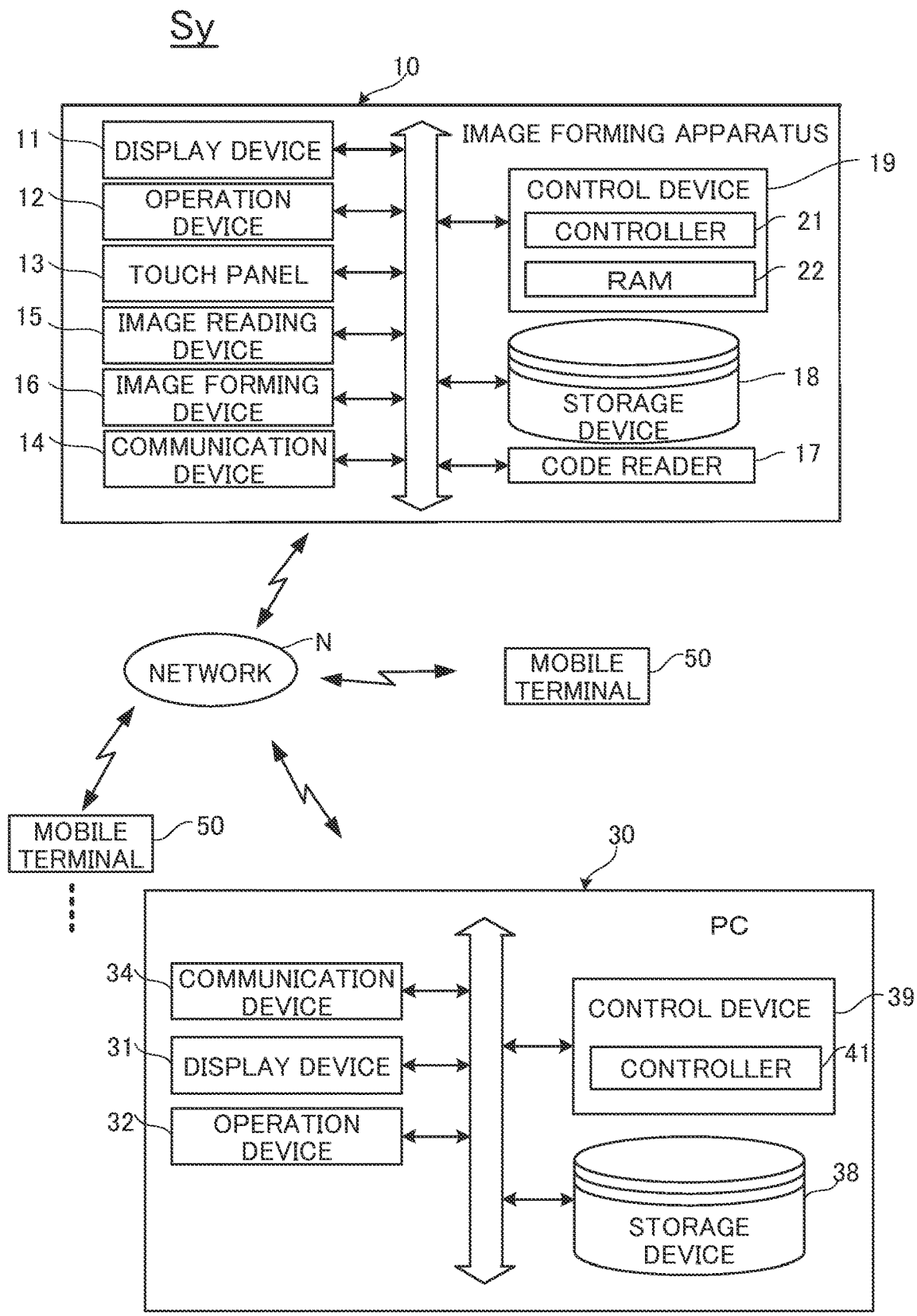
FIG. 1 is a block diagram showing a configuration of an image processing system according to an embodiment of the disclosure.

FIG. 1 illustrates a configuration of the image processing system Sy according to the embodiment of the disclosure. FIG. 1 includes block diagrams respectively showing the configuration of an image forming apparatus 10 and a personal computer (PC) 30, included in the image processing system Sy. In the image processing system Sy, the image forming apparatus 10, the PC 30, and a plurality of mobile terminals 50 are connected to one another, via a network N (e.g., intranet). The PC 30 and the mobile terminals 50 exemplify the information processing apparatus in the disclosure.

The image forming apparatus 10 is a multifunction peripheral (MFP) having a plurality of functions, such as a copying function, a printing function, and a scanning function. The image forming apparatus 10 includes a display device 11, an operation device 12, a communication device 14, a touch panel 13, an image reading device 15, an image forming device 16, a code reader 17, a storage device 18, and a control device 19. The mentioned components are configured to transmit and receive data and signals to and from each other, via a bus.

The display device 11 is, for example, constituted of a liquid crystal display (LCD) or an organic light-emitting diode (OLED) display. The operation device 12 includes hard keys such as a tenkey, an enter key, and a start key.

A touch panel 13 is overlaid on the screen of the display device 11. The touch panel 13 detects a contact (touch) of the user's finger made thereon, along with the touched position, and outputs a detection signal indicating the coordinate of the touched position, to a controller 21 of the control device 19 to be subsequently described. Therefore, the user can operate a graphical user interface (GUI) displayed on the screen of the display device 11, through the touch panel 13. The touch panel 13 serves as an operation device for the user to input instructions through the screen of the display device 11.

The image reading device 15 includes a scanner that optically reads an image of a source document placed on the contact glass. The image reading device 15 generates image data representing the image of the source document.

The image forming device 16 includes a photoconductor drum, a charging device that uniformly charges the surface of the photoconductor drum, an exposure device that exposes the surface of the photoconductor drum to light, thereby forming an electrostatic latent image on the surface of the photoconductor drum, a developing device that develops the electrostatic latent image on the surface of the photoconductor drum into a toner image, and a transfer device that transfers the toner image on the surface of the photoconductor drum onto a recording sheet, exemplifying the recording medium in the disclosure. The image forming device 16 prints the image represented by the image data, on the recording sheet.

The communication device 14 is a communication interface including a communication module such as a local area network (LAN) chip. The communication device 14 is connected to the PC 30 and the mobile terminal 50, via the network N. The communication device 14 performs data communication with the PC 30 or the mobile terminal 50.

The code reader 17 is, for example, an image camera capable of reading a QR code (registered trademark). The QR code exemplifies the print approval code in the disclosure. Either of a one-dimensional barcode and a two-dimensional barcode may be employed as the print approval code. In this embodiment, the QR code (registered trademark) is adopted as the two-dimensional barcode.

The storage device 18 is a large-capacity memory unit such as a solid-state drive (SSD) or a hard disk drive (HDD). The storage device 18 contains various application programs and various types of data.

The control device 19 includes a processor, a random-access memory (RAM), a read-only memory (ROM), and so forth. The processor is, for example, a central processing unit (CPU), an application specific integrated circuit (ASIC), or a micro processing unit (MPU). The control device 19 acts as the controller 21 (exemplifying the second controller), when the processor executes a second control program stored in the ROM or the storage device 18.

The controller 21 serves to control the overall operation of the image forming apparatus 10. The control device 19 is connected to the display device 11, the operation device 12, the touch panel 13, the communication device 14, the image reading device 15, the image forming device 16, the code reader 17, and the storage device 18. The controller 21 controls the operation of the mentioned components, and transmits and receives data and signals to and from each of those components.

The controller 21 serves as a processing device that executes various types of operations. The controller 21 is configured to control the display device 11 and the communication device 14. The controller 21 extracts and acquires the QR code from the image read by the code reader 17.

The PC 30 includes a display device 31, an operation device 32, a communication device 34, a storage device 38, and a control device 39. These components are configured to transmit and receive data and signals to and from each other, via a bus.

The display device 31 is constituted of a liquid crystal display or an organic electroluminescence display. The operation device 32 includes a keyboard and a pointing device, to be operated by the user.

The communication device 34 is a communication interface. The communication device 34 is connected to the image forming apparatus 10 via the network N, and transmits and receives data to and from the image forming apparatus 10.

The storage device 38 is a large-capacity memory unit such as an SSD or an HDD. The storage device 38 contains various application programs and various types of data.

The control device 39 includes a processor, a RAM, a ROM, and so forth. The control device 39 acts as a controller 41 (exemplifying the first controller), when the processor executes a first control program stored in the ROM or the storage device 38.

The controller 41 serves to control the overall operation of the PC 30. The control device 39 is connected to the display device 31, the operation device 32, the communication device 34, and the storage device 38. The controller 41 controls the operation of the mentioned components, and transmits and receives data and signals to and from each of those components. The controller 41 serves as a processing device that executes an operation according to an instruction inputted through the operation device 32. The controller 41 is configured to control the display device 31 and the communication device 34.

Each of the plurality of mobile terminals 50 is, for example, a smartphone or a mobile tablet. The plurality of mobile terminals 50 are each connected to a server via the network N.

The following refers to the case where the user has inputted, to the operation device 32 of the PC 30, an instruction to transmit a print job (image file and print setting information inclusive) through the GUI displayed on the screen of the display device 31. When the operation device 32 receives the input of the transmission instruction, the controller 41 of the PC 30 activates the printer driver (application program), and causes the printer driver to transmit the print job from the communication device 34 to the image forming apparatus 10, via the network N.

When the communication device 14 of the image forming apparatus 10 receives the print job, the controller 21 executes the print job received, by inputting the image in the file to the image forming device 16, and causing the image forming device 16 to form the image on the recording sheet.

Here, the user moves to the location where the image forming apparatus 10 is installed, to acquire the recording sheet on which the image has been recorded. However, the recording sheet is exposed on the image forming apparatus 10 until the user picks up the recording sheet from the image forming apparatus 10. Such a situation is undesirable, when the image is highly confidential. In addition, it is preferable that a plurality of users can efficiently utilize the same print job.

In this embodiment, therefore, the PC 30 transmits the print job and the respective mail addresses of a plurality of users, to the image forming apparatus 10 via the network N, so that the image forming apparatus 10 generates a QR code, and notifies the QR code to the users respectively corresponding to the plurality of mail addresses. The image forming apparatus 10 executes the print job, when the QR code is inputted. The image forming apparatus 10 inhibits the print job from being executed again on the basis of the QR code, and generates a second QR code and notifies the second QR code to the users respectively corresponding to the plurality of mail addresses. The image forming apparatus 10 executes the print job when the second QR code is inputted, and inhibits the print job from being executed again on the basis of the second QR code. Thereafter, the image forming apparatus 10 similarly repeats the generation, transmission, and input of additional QR codes, and the execution and inhibition of the print job, the number of times corresponding to the number of the plurality of mail addresses. The image processing system Sy executes such control, under a private print mode. The private print mode enables a plurality of users to efficiently utilize the same print job, while maintaining the confidentiality of the print job at a high level.

Figure 2:
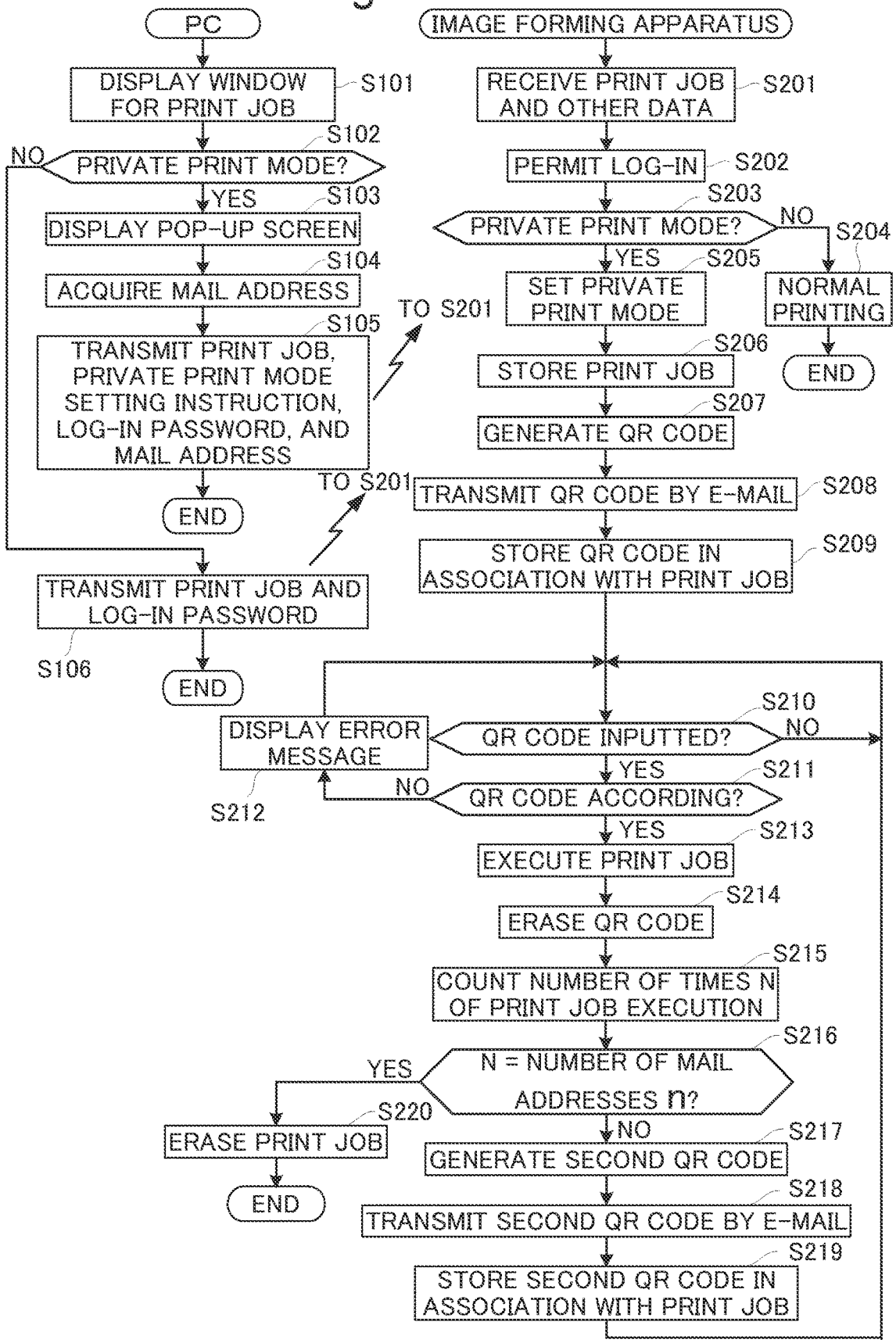
FIG. 2 is a flowchart showing a private print process.

Referring to a flowchart shown in FIG. 2, an operation process for setting the private print mode and executing the print job will be described, in further detail.

Figure 3:
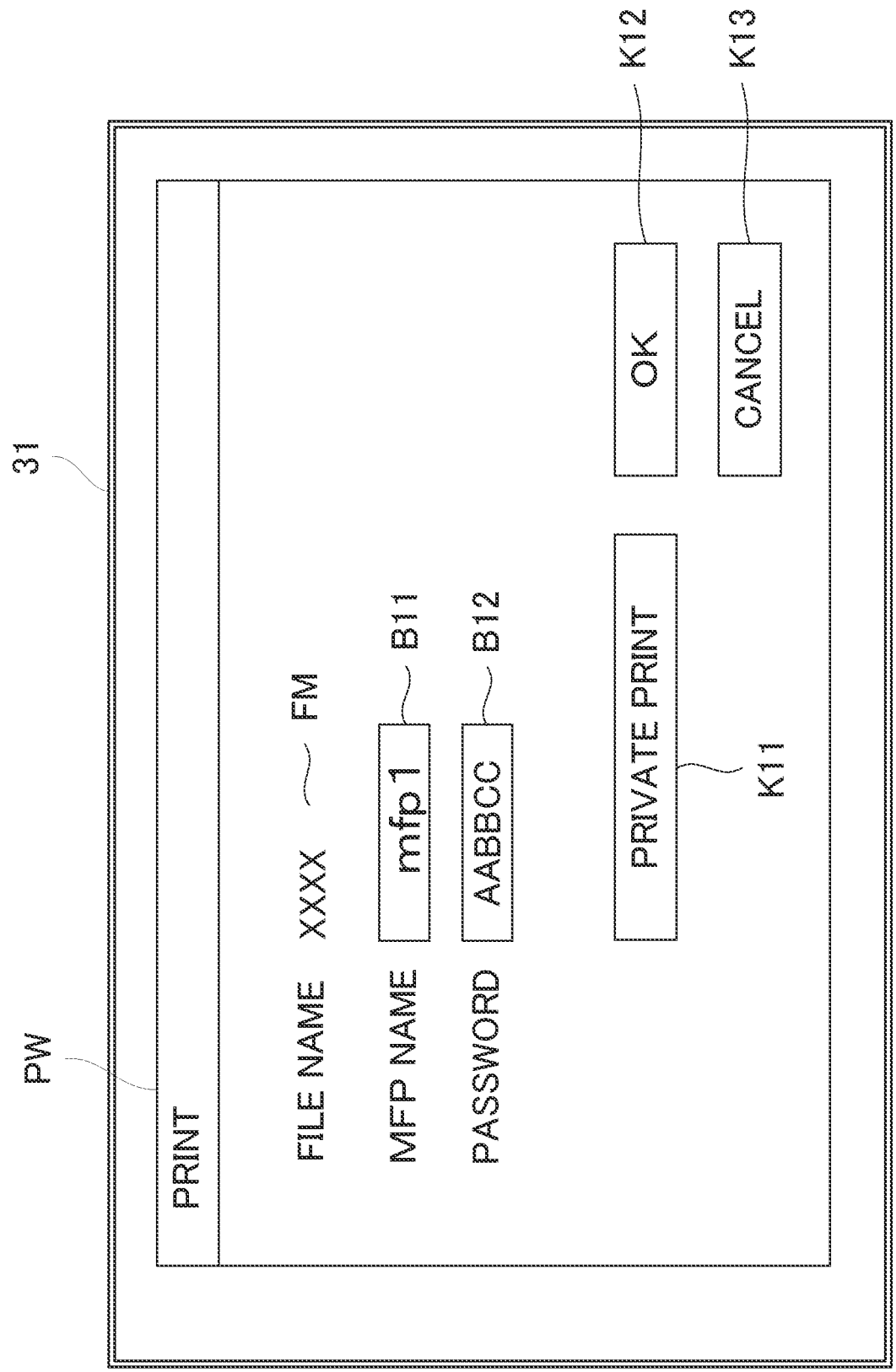
FIG. 3 is a schematic drawing showing an example of a window for a print job.

The user inputs an instruction to select a file to be printed, and an instruction to execute a print job of printing the image of the file, to the operation device 32 of the PC 30, through the GUI displayed on the screen of the display device 31. When the selection instruction and the execution instruction are inputted to the operation device 32, the controller 41 of the PC 30 activates the printer driver in response to the selection instruction and the execution instruction, and causes the display device 31 to display a window PW for the print job, as shown in FIG. 3 (step S101).

To be more detailed, the controller 41 causes the display device 31 to display, in the window PW for the print job, the name of the selected file to be printed (identification information) FM, a box B11 for inputting the name of the image forming apparatus 10 (identification information), a box B12 for inputting the log-in password of the user, a key K11 indicating the private print mode, an OK key K12, and a cancel key K13.

Figure 4:
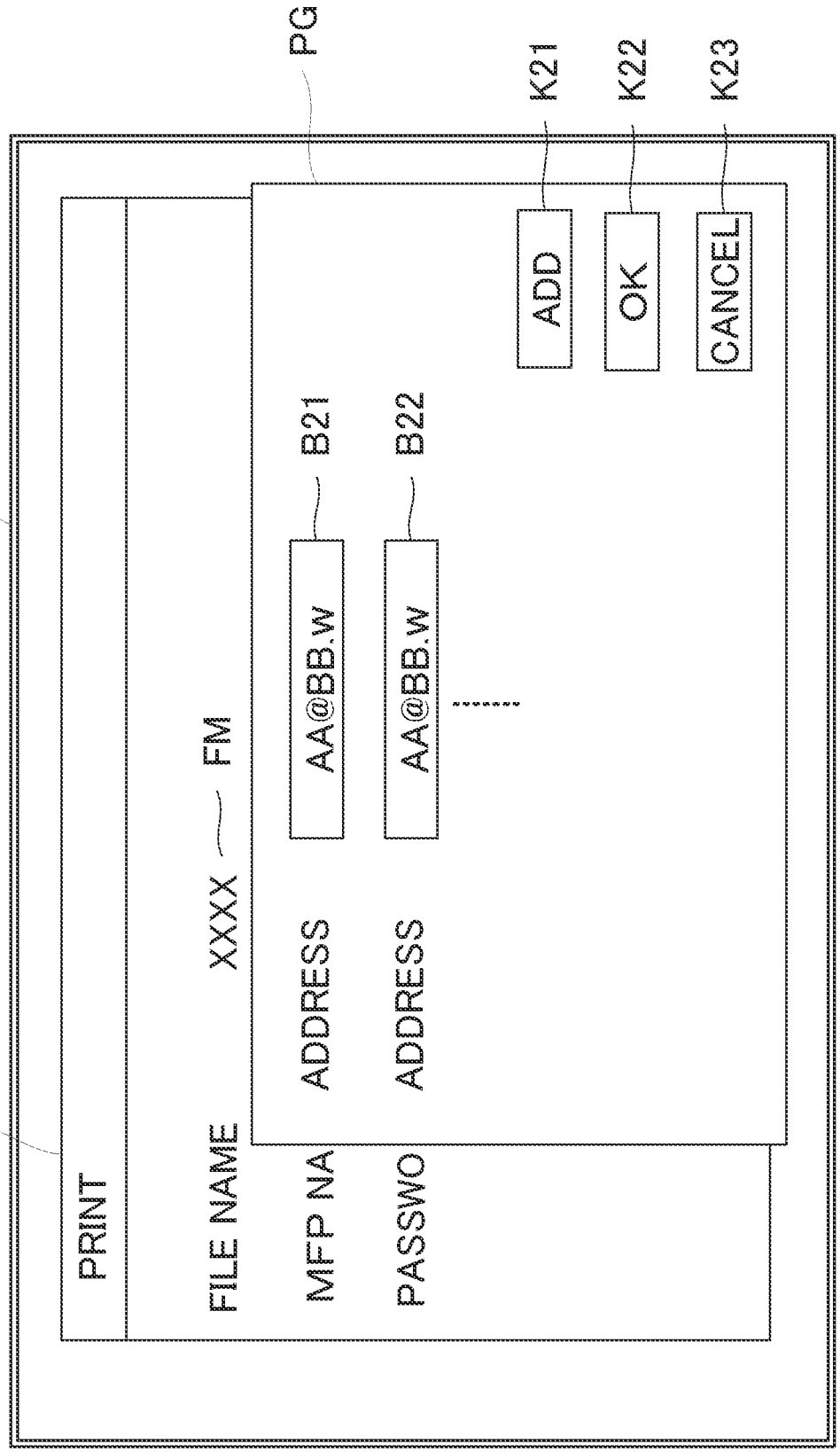
FIG. 4 is a schematic drawing showing an example of a pop-up screen.

Accordingly, the user can respectively input the name of the image forming apparatus 10, and the log-in password of the user through the boxes B11 and B12, and the instruction to set the private print mode through the key K11, by operating the operation device 32 of the PC 30. When the mentioned instructions are inputted to the operation device 32, the controller 41 of the PC 30 sets the private print mode (Yes at step S102), and causes the display device 31 to display a pop-up screen PG, as shown in FIG. 4 (step S103). To be more detailed, the controller 41 causes the display device 31 to display, in the pop-up screen PG, a box B21 in which the user's mail address is inputted in advance, a box B22 for inputting the mail address of another user, an addition key K21, an OK key K22, and a cancel key K23.

The user confirms his/her own mail address inputted in advance in the box B21, selects the box B22 through the operation device 32, and inputs the mail address of another user than him/herself in the box B22.

Here, upon receipt of the instruction to add the user, inputted through the addition key K21, the controller 41 causes the display device 31 to additionally display the box B22. The controller 41 causes the display device 31 to additionally display the box B22 in the pop-up screen PG, each time the instruction to add the user is received. The controller 41 receives the input of the mail address of another user through the added box B22, according to the user's operation performed on the operation device 32.

Upon receipt of an instruction to acquire the mail address through the OK key K22 in the pop-up screen PG, according to the user's operation performed on the operation device 32, the controller 41 acquires the respective mail addresses inputted in the box B21 and the box B22 (step S104), and closes the pop-up screen PG.

Further, upon receipt of the transmission instruction through the OK key K12 in the window PW for the print job, according to the user's operation performed on the operation device 32, the controller 41 transmits the print job for printing the image of the file to be printed, and the log-in password of the user, from the communication device 34 to the image forming apparatus 10 via the network N, together with the private print mode setting instruction, the user's mail address, and the mail address of the other user (step S105).

Here, when an instruction to cancel the job is inputted through the cancel key K23 in the pop-up screen PG, according to the user's operation performed on the operation device 32, the controller 41 closes the pop-up screen PG without performing the operation of step S104, and again causes the display device 31 to display the window PW for the print job shown in FIG. 3 (step S101). Then upon receipt of the instruction to cancel the job through the cancel key K13 in the window PW, according to the user's operation performed on the operation device 32, the controller 41 cancels the print job instead of executing the print job, and closes the window PW.

In contrast, upon receipt of a normal print instruction through the OK key K12, not the key K11, in the window PW for the print job, according to the user's operation performed on the operation device 32 (No at step S102), the controller 41 skips the setting of the private print mode, and transmits the print job for printing the image of the file to be printed, and the log-in password of the user, from the communication device 34 to the image forming apparatus 10 via the network N (step S106).

The communication device 14 of the image forming apparatus 10 receives the print job and the log-in password of the user, or the print job, the log-in password of the user, the private print mode setting instruction, the user's mail address, and the mail address of the other user (step S201).

The controller 21 of the image forming apparatus 10 decides whether the log-in password of the user accords with any of the plurality of log-in passwords included in a log-in management table stored in advance in the storage device 18. Upon deciding that the log-in password of the user accords with one of the plurality of log-in passwords, the controller 21 authenticates the log-in password of the user, and permits the user corresponding to the authenticated log-in password to log in in the image forming apparatus 10 (step S202).

After permitting the logging in in the image forming apparatus 10, the controller 21 decides whether the private print mode setting instruction has been received (step S203). Upon deciding that the private print mode setting instruction has not been received, in other words that only the print job and the user's log-in password have been received (No at step S203), the controller 21 skips the setting of the private print mode, and performs the normal print operation by immediately executing the print job (step S204). More specifically, the controller 21 inputs the image of the file to be printed in the image forming device 16, and causes the image forming device 16 to form the image on the recording sheet.

In contrast, upon deciding that the private print mode setting instruction has been received, in other words that the print job, the log-in password of the user, the private print mode setting instruction, the user's mail address, and the mail address of the other user have been received (Yes at step S203), the controller 21 sets the private print mode (step S205), and stores the print job received at step S201 in the RAM 22 in the control device 19 (step S206).

The controller 21 then generates the QR code (step S207), and e-mails each addressed to the user's mail address and the other user's mail address received at step S201, and transmits those e-mails, with the QR code attached to each of the e-mails, from the communication device 14 to the server on the network N (step S208). The controller 21 also stores the QR code in the RAM 22 in the control device 19, in association with the print job received at step S201 (step S209).

When generating the QR code, the controller 21 includes the information such as the name of the file to be printed by the print job, and a time stamp, in the QR code. In other words, the QR code represents the identification information of the print job.

Figure 5:
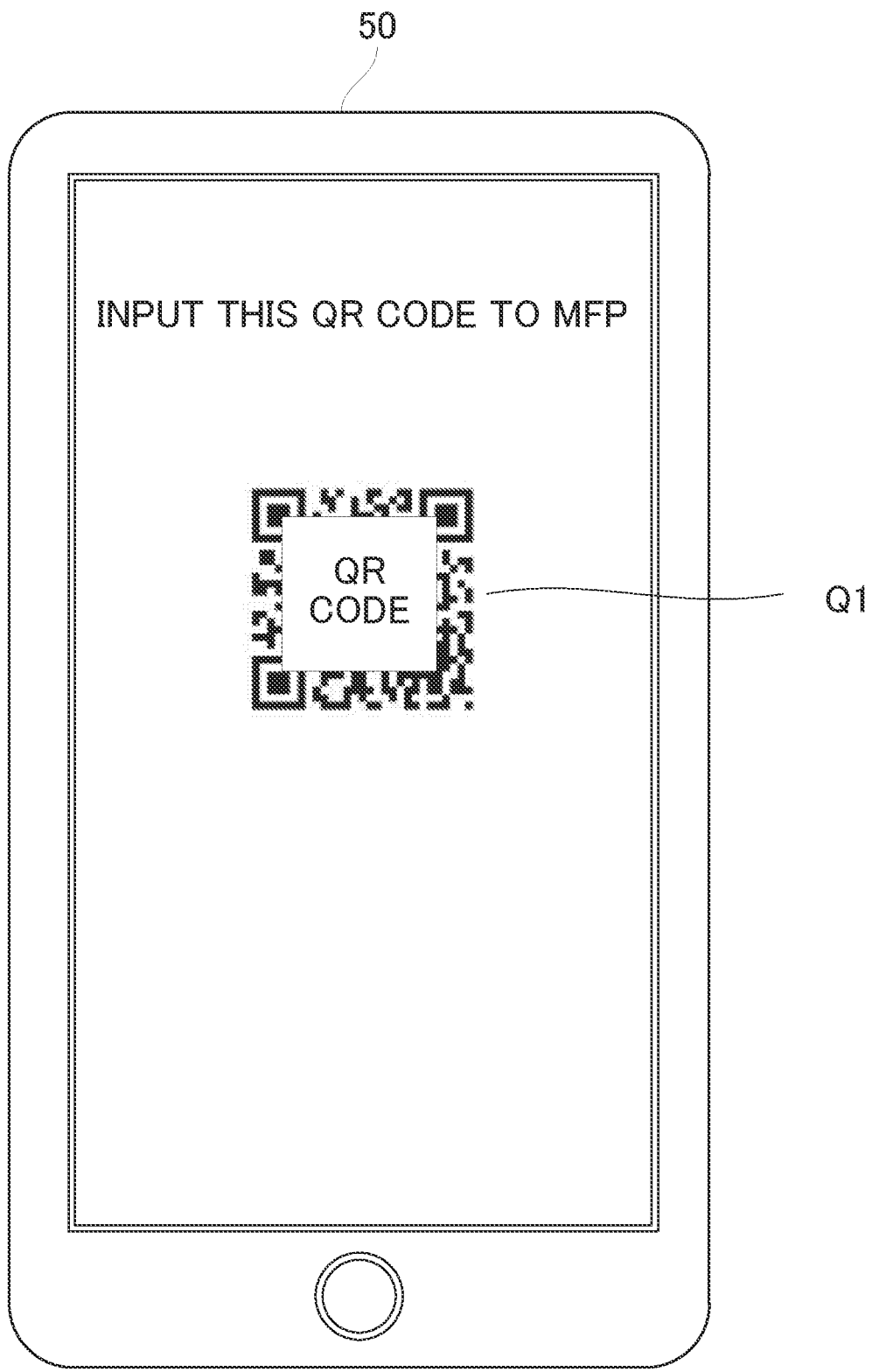
FIG. 5 is a schematic drawing showing an example of a QR code.

The mobile terminal 50 of the user, and the mobile terminal 50 of the other user, corresponding to the respective e-mail addresses to which the e-mails have been transmitted at step S208, each receive the e-mail through the server on the network N. Those mobile terminals 50 each include a controller, for example including a CPU, and a display device, for example including an LCD. The controllers of the respective mobile terminals 50 cause the respective display devices to display the QR code attached to the e-mails, on the screen of the respective mobile terminals 50. On the screen of the display device of those mobile terminals 50, a QR code (two-dimensional code) Q1 is displayed, for example as shown in FIG. 5.

The controller 21 of the image forming apparatus 10 displays a message urging the user to input the QR code, on the screen of the display device 11, and stands by for the input of the QR code (No at step S210).

The user goes to the image forming apparatus 10, with the mobile terminal 50 on which the QR code Q1 is displayed, and inputs the QR code Q1 displayed on the screen of the mobile terminal 50, by causing the code reader 17 to read the QR code Q1.

When the QR code Q1 is read by the code reader 17 and inputted (Yes at step S210), the controller 21 of the image forming apparatus 10 decides whether the QR code Q1 which has been inputted accords with the QR code stored in the RAM 22 at step S209 (step S211).

Upon deciding that the inputted QR code Q1 discords with the QR code stored in the RAM 22 at step S209 (No at step S211), the controller 21 causes the display device 11 to display a message notifying the input error of the QR code, on the screen (step S212). After step S212, the controller 21 returns to step S210.

In contrast, upon deciding that the inputted QR code Q1 accords with the QR code stored in the RAM 22 at step S209 (Yes at step S211), the controller 21 retrieves the print job associated with the QR code at step S209 from the RAM 22, and executes the print job. To be more detailed, the controller 21 inputs the image of the file to be printed in the image forming device 16, and causes the image forming device 16 to form the image on the recording sheet (step S213). The controller 21 also erases the QR code associated with the print job, from the RAM 22 (step S214). Such an operation prevents the print job associated with the QR code Q1 from being retrieved from the RAM 22 and executed, even though the QR code Q1 is again read by the code reader 17 and inputted. As result, the execution of the print job, based on the repeated input of the QR code Q1, can be inhibited.

The controller 21 counts the number of times of execution N of the print job (step S215), and decides whether the number of times of execution N accords with the number of mail addresses n, to which the QR code generated at step S207 was transmitted, in other words the number of users who received the QR code (step S216).

For example, when the controller 21 decides that the number of times of execution N of the print job discords with the number of the plurality of mail addresses n, to each of which the e-mail was transmitted at step S208 (No at step S216), it means that one or more users have not executed the print job, despite receiving the QR code. Therefore, the controller 21 generates the second QR code, different from the QR code generated at step S207 (step S217). Then the controller 21 generates e-mails each addressed to the user's mail address and the other user's mail address received at step S201, and transmits those e-mails, with the second QR code attached to each of the e-mails, from the communication device 14 to the server on the network N (step S218). The controller 21 stores the second QR code in the RAM 22 in the control device 19, in association with the print job received at step S201 (step S219). After step S219, the controller 21 returns to step S210.

When generating the second QR code, the controller 21 includes the information such as the name of the file to be printed by the print job, and a new time stamp, in the second QR code. In other words, the second QR code represents the identification information of the print job. The identification information of the print job indicated by the second QR code is different from the identification information of the print job indicated by the QR code generated first.

The mobile terminal 50 of the user, and the mobile terminal 50 of the other user, corresponding to the respective e-mail addresses to which the e-mails have been transmitted at step S218, each receive the e-mail through the server on the network N. The respective controllers of those mobile terminals 50 each cause the display device to display the QR code attached to the e-mail.

The controller 21 of the image forming apparatus 10 displays a message urging the user to input the QR code, on the screen of the display device 11, and stands by for the input of the QR code (No at step S210). When the QR code Q1 is read by the code reader 17 and inputted (Yes at step S210), the controller 21 decides whether the QR code Q1 which has been inputted accords with the second QR code stored in the RAM 22 at step S219 (step S211).

Upon deciding that the inputted QR code Q1 discords with the second QR code (No at step S211), the controller 21 causes the display device 11 to display a message notifying the input error of the QR code, on the screen (step S212). After step S212, the controller 21 returns to step S210.

In contrast, upon deciding that the inputted QR code Q1 accords with the second QR code (Yes at step S211), the controller 21 retrieves the print job associated with the second QR code at step S219 from the RAM 22, and executes the print job to print the image of the file to be printed (step S213). Then the controller 21 erases the second QR code associated with the print job that has been executed, from the RAM 22 (step S214). As result, the execution of the print job, based on the repeated input of the second QR code, can be inhibited.

The controller 21 counts the number of times of execution N of the print job (step S215). When the number of times of execution N discords with the number of the mail addresses n, to each of which the second QR code generated at step S207 was transmitted (No at step S216), it means that one or more users have not executed the print job. Therefore, the controller 21 generates a third QR code, different from the second QR code generated at step S207 (step S217). Then the controller 21 generates e-mails each addressed to the user's mail address and the other user's mail address received at step S201, and transmits those e-mails, with the third QR code attached to each of the e-mails, to the server on the network N (step S218). The controller 21 stores the third QR code in the RAM 22 in the control device 19, in association with the print job received at step S201 (step S219).

Thereafter, similarly to the above, when the code reader 17 reads the QR code Q1 (Yes at step S210), and the QR code Q1 which has been read accords with the third QR code stored in the RAM 22 at step S219 (Yes at step S211), the controller executes the print job (step S213), and erases the QR code associated with the print job, from the RAM 22 (step S214). The controller 21 then counts the number of times of execution N of the print job (step S215), and generates a fourth QR code (step S217), which is different from the QR code previously generated at step S217, when the number of times of execution N discords with the number of the plurality of mail addresses n, to each of which the e-mail was transmitted at step S208 (No at step S216). The controller 21 transmits e-mails addressed to the respective users, with the fourth QR code attached to each of the e-mails, to the server on the network N (step S218), and stores the fourth QR code in the RAM 22 in the control device 19, in association with the print job received at step S201 (step S219).

When the number of times of execution N of the print job has reached the number of the plurality of mail addresses n to each of which the e-mail was transmitted at step S208, so that these numbers accord with each other (Yes at step S216), the controller 21 decides that there is no longer a user who has not executed the print job, and erases the print job received at step S201 from the RAM 22, thereby invalidating the print job (step S220). After step S220, the controller 21 finishes the process.

For example, in the case where the user has only inputted his/her mail address in the box B21, without inputting any other mail address in the box B22, in the pop-up screen PG shown in FIG. 4, the controller 21 sets the number of mail address n to "1". Upon executing the print job once (step S213), the controller 21 sets the number of times of execution N of the print job to "1", and erases the print job from the RAM 22 thereby invalidating the print job (step S220), on the basis of the decision that N equals to n (Yes at step S216). After step S220, the controller 21 finishes the process.

In contrast, when the user has inputted his/her mail address in the box B21, and also inputted the mail address of another user in the box B22, in the pop-up screen PG, the controller 21 sets the number of mail addresses n to "2". When the print job is executed once (step S213), the controller 21 sets the number of times of execution N of the print job to "1", and therefore does not decide that N equals to n (No at step S216). In this case, the controller 21 generates, transmits, and stores the second QR code (step S217 to step S219). Then upon executing the print job again under the mentioned state (step S213), the controller 21 sets the number of times of execution N of the print job to "2". Accordingly, the controller 21 decides that N=n has been established (Yes at step S216), and erases the print job received at step S201 from the RAM 22, thereby invalidating the print job (step S220). After step S220, the controller 21 finishes the process.

Likewise, when the user has inputted three or more mail addresses in the box B21 and boxes B22 in the pop-up screen PG, the controller 21 sets the number of mail addresses n to "3" or larger, repeats the generation, transmission, and storage of additional QR codes (step S217 to step S219), and sequentially executes the print job (step S213). When the number of times of execution N of the print job reaches "n" (Yes at step S216), the controller 21 erases the print job received at step S201 from the RAM 22, thereby invalidating the print job (step S220). After step S220, the controller 21 finishes the process.

Now, when a plurality of users are to utilize the same print job under the aforementioned existing printing system, a plurality of steps have to be followed, such that a client terminal transmits a two-dimensional barcode to the mobile terminals of the respective users, an authentication device reads the two-dimensional barcode displayed on the screen of each of the mobile terminals and transmits a print request to the client terminal, the client terminal transmits the print job to a printer terminal, and the printer terminal executes the print job. Thus, a complicated process has to be repeated.

In the image processing system according to the foregoing embodiment, in contrast, the QR code is generated by the image forming apparatus 10, and notified to the users respectively corresponding to the plurality of mail addresses. When the QR code is inputted to the image forming apparatus 10, the print job is executed by the image forming apparatus 10, and the repeated execution of the print job based on the QR code is inhibited. Then the second QR code is generated by the image forming apparatus 10, and notified to the users respectively corresponding to the plurality of mail addresses. When the second QR code is inputted to the image forming apparatus 10, the print job is executed by the image forming apparatus 10, and the repeated execution of the print job based on the second QR code is inhibited. Thereafter, similarly to the above, the generation, transmission, and input of the additional QR codes, and the execution and inhibition of the print job are repeated, the same number of times as the number of the plurality of mail addresses. Such an arrangement enables the plurality of users to efficiently utilize the same print job.

According to the foregoing embodiment, in addition, the QR code is changed each time the print job is executed, and the print job is erased, when the number of times of execution N of the print job has reached the number of the plurality of mail addresses n, so that these numbers accord with each other. Therefore, the confidentiality of the print job can be maintained at a high level.

Here, although the controller 21 changes the QR code each time the print job is executed, in the foregoing embodiment, the disclosure is not limited to such embodiment. For example, the controller 21 may generate, at a time, the same number of QR codes different from each other, as the number of the plurality of mail addresses, with respect to the same print job. In this case, upon setting the private print mode, the controller 21 of the image forming apparatus 10 generates the same number of QR codes different from each other, as the number of the plurality of mail addresses, and also generates the e-mails addressed to the respective mail addresses. Then the controller 21 assigns the QR codes to the respective e-mails as annex thereto, transmits these e-mails to the server on the network N, and stores the QR codes in the RAM 22 in association with the print job. The controller 21 executes the print job, when the QR code read by the code reader 17 accords with one of the QR codes associated with the print job, and erases the QR code that has accorded from the RAM 22, thereby inhibiting the execution of the print job based on the repeated input of the QR code. When all of the QR codes associated with the print job have been erased from the RAM 22, the controller 21 erases the print job, thereby invalidating the same. Such an arrangement also enables the confidentiality of the print job to be maintained at a high level, while allowing a plurality of users to efficiently utilize the same print job.

Further, although the print approval code is exemplified by the QR code in the foregoing embodiment, a two-dimensional code of a different type, or a one-dimensional code such as a barcode, may be employed instead.

The configurations and processings according to the foregoing embodiment, described with reference to FIG. 1 to FIG. 5, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image processing system comprising:
an information processing apparatus including:
   an operation device to which an instruction of a user is inputted;
   a first communication device that performs data communication with an image forming apparatus, via a network; and
   a first control device including a processor, and configured to act, when the processor executes a first control program, as a first controller that transmits, upon receipt of a private print mode setting instruction through the operation device, a print job, the setting instruction, and a plurality of prespecified mail addresses, to the image forming apparatus via the first communication device, and
the image forming apparatus including:
   an image forming device that forms an image on a recording medium;
   a second communication device that performs data communication with the information processing apparatus, via the network;
   an input device to which a first print approval code is inputted; and
   a second control device including a processor, and configured to act, when the processor executes a second control program, as a second controller that:
      sets the private print mode, upon receipt of the print job, the setting instruction, and the plurality of mail addresses via the second communication device;
      generates a second print approval code;
      transmits the second print approval code to each of the plurality of mail addresses via the second communication device; and
      executes the print job, in a case where the first print approval code and the second print approval code accord with each other, when the first print approval code is received via the input device, by causing the image forming device to form the image on the recording medium,
wherein the second controller of the image forming apparatus is configured to:
execute the print job, when the first print approval code is received through the input device, and the first print approval code accords with the second print approval code, and inhibit repeated execution of the print job based on the second print approval code;
generate another second print approval code, when a number of times of execution of the print job is fewer than a number of the plurality of mail addresses, and transmit the other second print approval code to each of the plurality of mail addresses through the second communication device; and
keep from generating the other second print approval code, when the number of times of execution of the print job has reached the number of the plurality of mail addresses.

2. The image processing system according to claim 1, wherein the second controller of the image forming apparatus invalidates the print job,
when the number of times of execution of the print job has reached the number of the plurality of mail addresses.

3. An image processing system comprising:
an information processing apparatus including:
   an operation device to which an instruction of a user is inputted;
   a first communication device that performs data communication with an image forming apparatus, via a network; and
   a first control device including a processor, and configured to act, when the processor executes a first control program, as a first controller that transmits, upon receipt of a private print mode setting instruction through the operation device, a print job, the setting instruction, and a plurality of prespecified mail addresses, to the image forming apparatus via the first communication device, and
the image forming apparatus including:
   an image forming device that forms an image on a recording medium;
   a second communication device that performs data communication with the information processing apparatus, via the network;
   an input device to which a first print approval code is inputted; and
   a second control device including a processor, and configured to act, when the processor executes a second control program, as a second controller that:
      sets the private print mode, upon receipt of the print job, the setting instruction, and the plurality of mail addresses via the second communication device;
      generates a second print approval code;
      transmits the second print approval code to each of the plurality of mail addresses via the second communication device; and
      executes the print job, in a case where the first print approval code and the second print approval code accord with each other, when the first print approval code is received via the input device, by causing the image forming device to form the image on the recording medium,
wherein the second controller of the image forming apparatus is configured to:
generate a same number of the second print approval codes different from each other, as the number of the plurality of mail addresses, and transmit the respective second print approval codes to the plurality of mail addresses through the second communication device; and
execute the print job, when the first print approval code is received through the input device, and the first print approval code accords with one of the plurality of the second print approval codes, and inhibit repeated execution of the print job based on the second print approval code that has accorded.

4. The image processing system according to claim 3, wherein the second controller of the image forming apparatus invalidates the print job, when a number of times of execution of the print job has reached the number of the second print approval codes.

\* \* \* \* \*